United States Patent
Tan

(10) Patent No.: US 7,792,751 B2
(45) Date of Patent: Sep. 7, 2010

(54) METHOD AND SYSTEM FOR DELAYED PAYMENT OF PREPAID CARDS

(75) Inventor: Edwin Tan, New York, NY (US)

(73) Assignee: NameDepot.Com, Inc., Sunnyvale, CA (US)

( * ) Notice: Subject to any disclaimer, the term of this patent is extended or adjusted under 35 U.S.C. 154(b) by 38 days.

(21) Appl. No.: 12/134,149

(22) Filed: Jun. 5, 2008

(65) Prior Publication Data

US 2009/0307130 A1 Dec. 10, 2009

(51) Int. Cl.
G06Q 20/00 (2006.01)
(52) U.S. Cl. .................... 705/41; 705/35; 705/36
(58) Field of Classification Search ............ 705/1–80; 235/375, 379, 380; 380/255
See application file for complete search history.

(56) References Cited

U.S. PATENT DOCUMENTS

| | | | |
|---|---|---|---|
| 6,375,073 | B1 | 4/2002 | Aebi et al. |
| 7,003,500 | B1 | 2/2006 | Driessen |
| 7,295,658 | B2 | 11/2007 | Moon et al. |
| 2001/0042784 | A1 | 11/2001 | Fite et al. |
| 2002/0095390 | A1 | 7/2002 | Hovsepian |
| 2003/0128827 | A1 | 7/2003 | Khan |
| 2004/0193490 | A1* | 9/2004 | Pletz .......................... 705/14 |
| 2004/0260607 | A1* | 12/2004 | Robbins et al. ............... 705/14 |
| 2006/0138215 | A1 | 6/2006 | Pallares |
| 2006/0293963 | A1* | 12/2006 | Hoblit ......................... 705/15 |
| 2007/0094129 | A1* | 4/2007 | Graves et al. ................ 705/38 |
| 2007/0100707 | A1 | 5/2007 | Driessen et al. |
| 2007/0112655 | A1 | 5/2007 | Jones |
| 2007/0208869 | A1 | 9/2007 | Adelman et al. |
| 2007/0288326 | A1* | 12/2007 | Boldin ........................ 705/26 |
| 2008/0022375 | A1 | 1/2008 | Stanley |
| 2008/0041938 | A1 | 2/2008 | Wise |
| 2008/0070548 | A1* | 3/2008 | Cha et al. ................... 455/411 |
| 2009/0192928 | A1* | 7/2009 | Abifaker ..................... 705/35 |

FOREIGN PATENT DOCUMENTS

| | | |
|---|---|---|
| KR | 20000035847 A | 6/2000 |
| KR | 20010084957 | 9/2001 |
| KR | 20030013074 | 2/2003 |
| KR | 20030091077 A | 12/2003 |
| KR | 20040075191 A | 8/2004 |
| KR | 20080028686 | 4/2008 |
| WO | WO-0111443 A2 | 2/2001 |

OTHER PUBLICATIONS

Mark Furletti, Prepaid Card Markets & Regulation, Feb. 2004, Federal Reserve Bank of Philadelphia, pp. 1-19.*

(Continued)

*Primary Examiner*—Mary Cheung
*Assistant Examiner*—Marissa Liu
(74) *Attorney, Agent, or Firm*—Perkins Coie LLP

(57) ABSTRACT

A method and system for accepting delayed payment of prepaid cards is described. The method includes providing a prepaid card to a purchaser, the prepaid card associated with a face value. The method includes, responsive to a redemption of the prepaid card, providing a consideration in accordance to the face value. The method includes receiving a payment for the prepaid card after the consideration has been provided.

17 Claims, 5 Drawing Sheets

OTHER PUBLICATIONS

"Craigslist Rolls Out New Phone Verification Policy",The e Sale Guys, http://esalesguys.blogsbot.com/2008/02craigslists-rolls-out-new-phone,pp. 1-3, Published. Sep. 30, 2009.
International Search Report PCT/US2008/010044 dated Mar. 24, 2009, pp. 1-2.
International Search Report PCT/US2009/003101 dated Dec. 30, 2009, pp. 1-3.
International Search Report PCT/US2009/045965 dated Jan. 14, 2010, pp. 1-3.
Written Opinion PCT/US2009/045965 dated Jan. 14, 2010, pp. 1-4.
Co-pending U.S. Appl. No. 12/191,161 filed Aug. 13, 2008.
Co-pending U.S. Appl. No. 11/903,227 filed Sep. 20, 2007.
Co-pending U.S. Appl. No. 12/628,040 filed Nov. 30, 2009.
International Search Report PCT/US2009/051011 dated Feb. 17, 2010, pp. 1-3.
Written Opinion PCT/US2009/051011 dated Feb. 17, 2010, pp. 1-5.

* cited by examiner

FIG. 4A

| Identifier | Description | Activated? | Date of Sale | Date of Activation | Date of Use | Remaining Value | |
|---|---|---|---|---|---|---|---|
| 1 | 1 domain name | yes | 5/22/2007 | 5/22/2007 | 5/28/2007 | 0 | —402 |
| 2 | 1 year 10GB online storage | no | 5/25/2007 | 5/25/2007 | - | 1 | —402 |
| 3 | 3 domain names | no | - | - | - | 3 | —402 |
| ... | ... | ... | ... | ... | ... | ... | —402 |

| | | | | | | |
|---|---|---|---|---|---|---|
| 1 | 1 domain name | yes | 5/22/2007 | 5/22/2007 | 5/28/2007 | 0 |
| 404 | 406 | 408 | 410 | 412 | 414 | 416 |

—402'

METHOD AND SYSTEM FOR DELAYED PAYMENT OF PREPAID CARDS

BACKGROUND

A prepaid card includes a prepaid card identifier and is associated with a consideration for which the prepaid card can be redeemed. The consideration can be anything of value, such as products or services. Partial redemption is possible if the prepaid card is associated with a consideration that can be prorated. For example, a prepaid card can be a retail store gift card with a dollar value, a prepaid cellular airtime card, or any other prepaid card that redeems for multiple products or instances of service.

Previously, a card purchaser pays for a prepaid card at the time of purchase. A card purchaser wishing to purchase one or more prepaid cards from a retail location, such as a store or an automated kiosk, receives the prepaid cards in exchange for payment in currency. This is disadvantageous to the card purchaser if there will be delay between the purchase and the redemption of the prepaid card.

Previously, retail stores receive prepaid cards from wholesalers for in-store placement and sale to card purchasers. In some instances, retail stores only pay the wholesalers for the prepaid cards when the prepaid cards are purchased by the card purchasers. This is advantageous to the retail store by minimizing inventory and carrying costs of the prepaid cards.

A card purchaser can purchase prepaid cards in bulk for distribution as gifts in promotional or marketing activities. Such prepaid cards are distributed to card recipients as part of the promotion or marketing activity. Many prepaid cards can remain unused by the card recipients. This creates waste for the card purchaser in the unused prepaid cards. Further, paying the card purchase price does not benefit the card purchaser until the prepaid cards are used by the card recipients, when the promotional or marketing benefits accrue.

BRIEF DESCRIPTION OF DRAWINGS

FIG. 4A illustrates an example data structure for storing prepaid card information.

FIG. 4B illustrates an example data entry for storing prepaid card information.

DETAILED DESCRIPTION

A prepaid card is sold to a card purchaser for a delayed payment. A delayed payment is not collected until the prepaid card is redeemed for consideration by a card recipient. The card purchaser can purchase multiple prepaid cards for distribution to gift recipients, and will not be required to pay for un-redeemed prepaid cards. If a prepaid card is partially redeemed, payment for the prepaid card is prorated.

Figure 1:
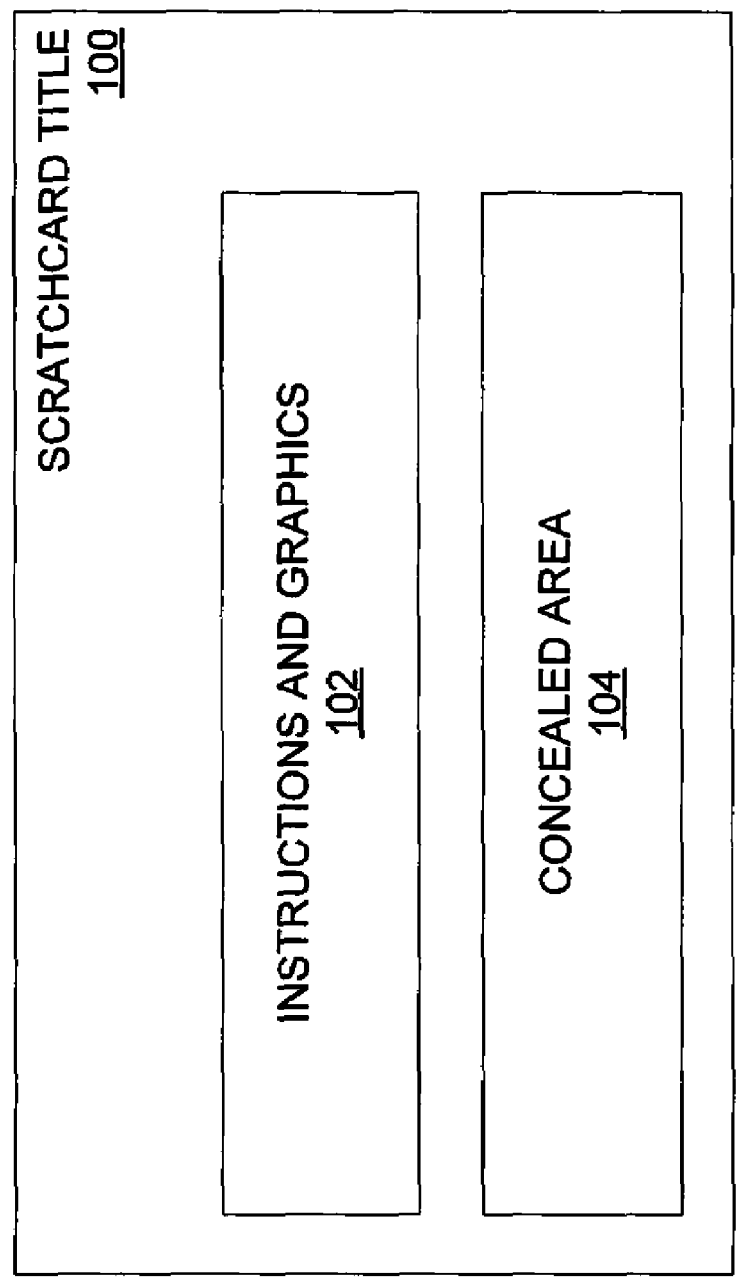
FIG. 1 illustrates an example prepaid card.

FIG. 1 illustrates an example prepaid card. For example, a prepaid card can be a scratchcard (also called a scratch off, scratch ticket, scratcher, scratchie, scratch-it, scratch game, or instant game) in the form of a card, usually made of cardboard or plastic. This facilitates user transportation of the scratch card by users and improves user familiarity and comfort.

The prepaid card can include a title 100 printed on its face. The title 100 can be text, graphics, or any other visual representation of information.

The prepaid card can also have instructions and graphics 102 printed or otherwise displayed on its face. The instructions and graphics 102 can be a combination of text and graphics. Additional text and graphics can be included on a backside of the prepaid card.

The prepaid card can include one or more concealed areas 104 that contain information. The concealed area 104 can be covered by an opaque substance such as latex that cannot be seen through, but can be scratched off or otherwise removed. Concealed information can include a prepaid card identifier.

Alternatively, the concealed area 104 can be covered with a peel-off strip configured to be easily removed by the user. The strip is opaque and cannot be seen through, but can be easily removed by the user to reveal the concealed information. Alternative coverings that are easily removed by the user can also be used.

The prepaid card can be individually packaged in a transparent material, such as plastic, to protect it from handling during shipping and sale and yet allow its printed surfaces to be visible to a user or purchaser. The prepaid card can be packaged together in groups of prepaid cards. In one example, prepaid cards of a same type are packaged together for sale. In another example, prepaid cards with complementary considerations are packaged together for sale.

Alternatively, the prepaid card can be any object configured to securely convey a prepaid card identifier to a gift recipient. For example, an email sent to the gift recipient's email address can contain the prepaid card identifier. An automated telephone call to a gift recipient's phone number can convey the prepaid card identifier to the gift recipient in audio format. Alternatively, the prepaid card identifier can be securely mailed to a gift recipient via regular post.

Figure 2:
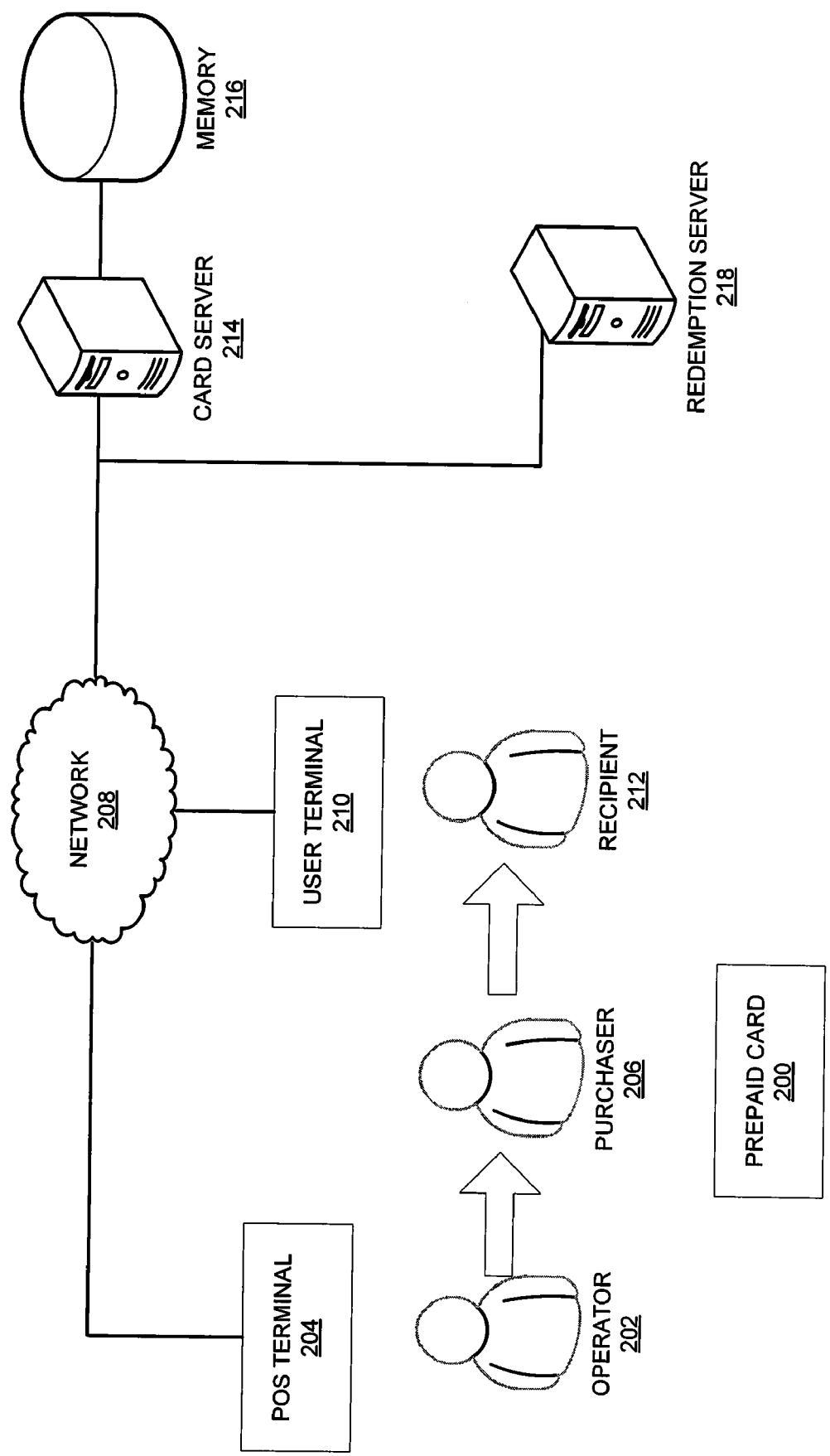
FIG. 2 illustrates an example system for providing delayed payment of prepaid cards.

FIG. 2 illustrates an example system for providing delayed payment of prepaid cards. The system sells a prepaid card 200 to a card purchaser 206 in exchange for a delayed payment. The delayed payment is not processed until a card recipient 212 has redeemed the prepaid card 200.

A prepaid card 200 can be sold by an operator 202 at a point of sales terminal 204 to a purchaser 206. For example, the prepaid card can be as illustrated in FIG. 1. The prepaid card 200 can be sold from a point of sales terminal 204 operated by the operator 202 at a retail location, such as a convenience store, a supermarket, or any other location configured to sell products or services to the purchaser 206.

In an alternative embodiment, the prepaid card 200 can be sold from an automated kiosk placed at a high-traffic location, such as a subway stop, a pedestrian walkway, or a similar location accessible to the purchaser 206. The automated kiosk does not require an operator 202. The automated kiosk can function as a point of sales terminal 204 within the system.

The purchaser 206 receives the prepaid card 200 in exchange for a delayed payment. For example, the delayed payment can be a credit card account that will not be charged until the prepaid card 200 is redeemed for its associated consideration. Alternatively, a debit card, an escrow account, a bank account, or any other form of currency capable of being processed at a later time can be used.

In an alternative example, the purchaser 206 can pay for the prepaid card 200 immediately, and a refund will be provided by the system at a later time. For example, a refund can be provided if the prepaid card 200 is not redeemed before a predetermined expiration date. This simplifies the payment processing by not requiring payment in a form that can be processed at a later time.

The point of sales terminal 204 is in communications with a network 208. The network 208 can be any network configured to carry digital information, such as the Internet, a private network, or any other network. Communications over the network 208 can be encrypted or otherwise secured to protect privacy and ensure security.

A recipient 212 can receive the prepaid card 200. For example, the recipient 212 can be the same person as the purchaser 206.

Alternatively, the recipient 212 can be a different person from the purchaser 206. In this example, the purchaser 206 purchased the prepaid card 200 as a gift for the recipient 212. Alternatively, the recipient 212 can be a target for a marketing or promotional activity conducted by the purchaser 206.

The recipient 212 can access a user terminal 210 in order to redeem the prepaid card 200. As discussed above, the prepaid card 200 can be redeemed for consideration, such as products or services. The terminal 210 can be in communications with the network 208.

In an alternative example, the recipient 212 takes the prepaid card 200 to a physical redemption center for redemption. For example, the prepaid card 200 can be redeemed for a physical service such as a car wash, laundry, or similar services that are most efficiently redeemed at a physical redemption center. The physical redemption center can include a user terminal 210 used to confirm the prepaid card 200's validity before redemption. The user terminal 210 at the physical redemption center can be used by an operator of the physical redemption center to interact with the servers, discussed below.

In an alternative example, the user terminal 210 is in communication with a different network from the point of sales network 204. The alternative network (not depicted) can be any network configured to carry digital information. Similar to the network 208, information transmitted over the alternative network can be encrypted or otherwise secured.

In an alternative example, if the prepaid card 200 is a multi-use card valid for a plurality of redemptions, a delayed payment can be processed for each redemption. This allows the payment by the purchaser 206 to be more closely tied to the consideration received by the recipient 212.

A card server 214 is in communications with the point of sales terminal 204 and the user terminal 210 over the network 208. The card server 214 maintains a list of prepaid cards in circulation and data associated with the prepaid cards.

The card server 214 receives an activation request from the point of sales terminal 204 at the time of sale of the prepaid card 200. A record in memory 216 representing the prepaid card 200 is updated to reflect its activation status, so that the prepaid card 200 can later be redeemed by the recipient 212. Activation of the prepaid card 200 at the time of sale can be a security function to prevent redeeming counterfeit prepaid cards or prepaid cards that were not paid for.

Similarly, the card server 214 receives a redemption request from the user terminal 210 at the time of redemption of the prepaid card 200. The card server 214 determines whether the prepaid card 200 is valid and activated before allowing redemption to proceed. The record representing the prepaid card 200 stored in memory 216 can be updated to reflect its redeemed status.

A prepaid card 200 can be invalid if it was not properly activated, its prepaid card identifier cannot be found by the card server 214, it has expired, or another reason. If the prepaid card 200 is valid, the redemption request is forwarded to a redemption server 218 for processing.

The card server 214 also processes the payment for the prepaid card 200 when the redemption request is forwarded.

As discussed previously, the purchaser 206 provided a delayed payment that can be charged or collected at the time of redemption. Alternatively, the purchaser 206 can provide payment immediately at purchase and be entitled to a refund at a later time, as discussed above.

The memory 216 is accessible to the card server 214 and stores necessary data related to the sale and redemption of the prepaid card 200. For example, the memory 216 stores a data structure illustrated in FIGS. 4A and 4B representing the prepaid cards of the system.

A redemption server 218 can handle redemption of the prepaid card 200. A service can be redeemed by transmitting an authorization to a service provider authorizing the service provider to provide the requested service to the recipient 212. A product can be redeemed by initiating a fulfillment process that will ship the product to the recipient 212. Alternatively, a voucher can be transmitted to the user terminal 210 for printing by the recipient 212 for redemption at a physical redemption center.

In an example embodiment, the purchaser 206 can access an Internet web-based control panel to monitor a status of the prepaid card 200. The purchaser 206 can input identifying information regarding the recipient 212 via the web-based control panel or at the time of purchase of the card at the POS terminal 204. This facilitates the purchaser 206 from easily determining the status of each prepaid card 200 purchased and given as a gift.

Figure 3A:
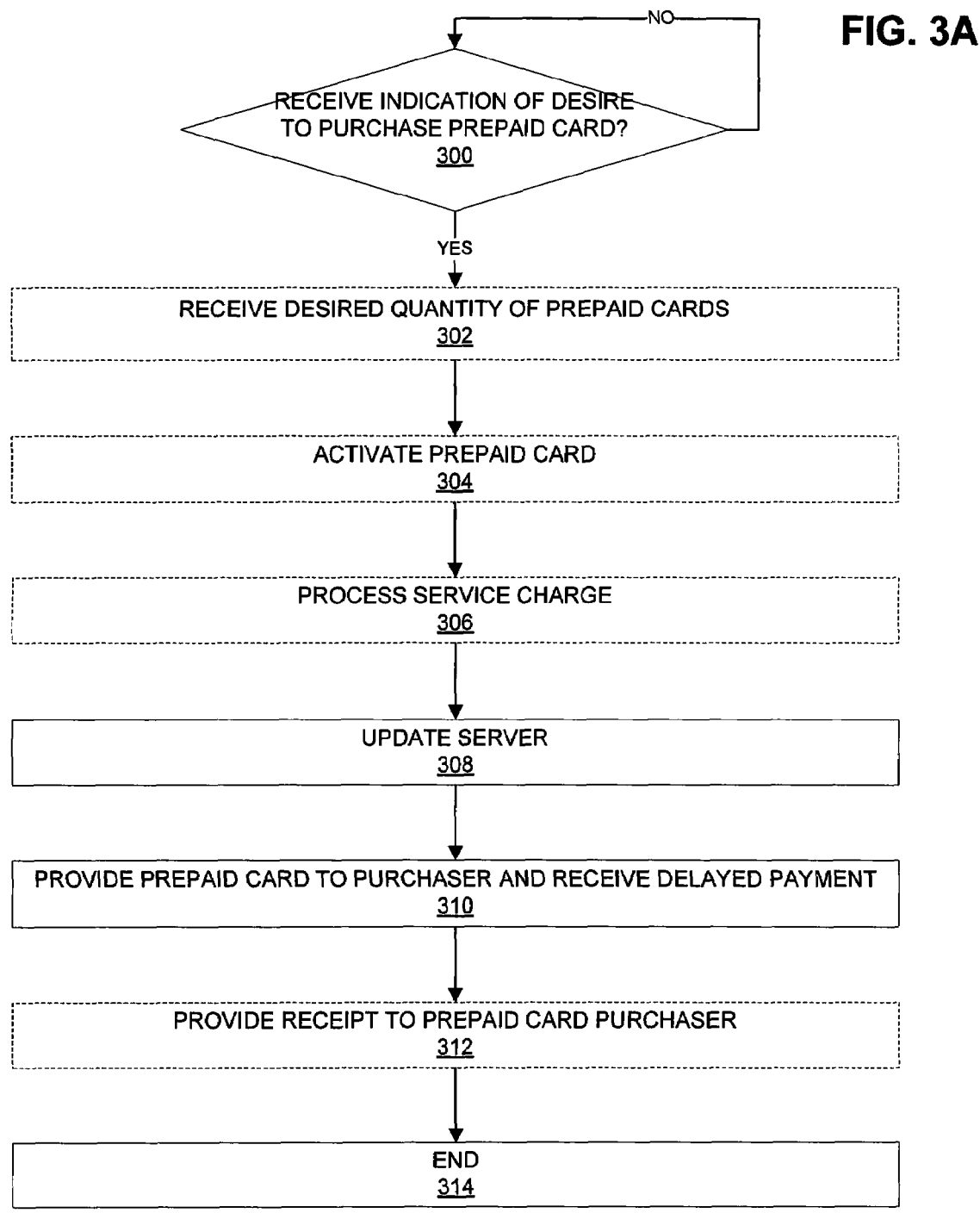
FIG. 3A illustrates a procedure for selling a delayed payment prepaid card.

FIG. 3A illustrates a procedure for selling a delayed payment prepaid card. A prepaid card is sold to a purchaser and is later redeemed by a recipient. The prepaid card can be sold by an operator at a point of sales terminal, from an automated kiosk, or from any other authorized seller of prepaid cards. For example, the procedure can execute on the point of sales terminal. A delayed payment made by the purchaser for the prepaid card is not processed until the prepaid card is redeemed.

In 300, the point of sales terminal determines whether an indication of a purchaser's desire to purchase a prepaid card is received. The operator of the point of sales terminal inputs a command initiating a prepaid card sales process responsive to a purchaser request to purchase a prepaid card.

Alternatively, the prepaid card can be displayed in a display area of a retail store accessible by the purchaser. The purchaser can take a prepaid card to the point of sales terminal for purchase.

If an indication is received, the point of sales terminal proceeds to 302. If no indication is received, the point of sales terminal waits at 300 for the indication.

In 302, the point of sales terminal optionally receives a desired quantity of prepaid cards to be purchased. For example, the operator can input the desired quantity of prepaid cards into the point of sales terminal responsive to a purchaser indication.

If the prepaid cards are taken by the purchaser to the point of sales terminal, the desired quantity of prepaid cards is equal to a number of prepaid cards brought to the point of sales terminal by the purchaser.

Alternatively, multiple prepaid cards can be packaged together for sale. This allows the purchaser to purchase a predetermined quantity of prepaid cards in one package.

In 304, the point of sales terminal optionally activates the prepaid card. Activating the prepaid card can include determining a prepaid card identifier and transmitting the prepaid card identifier to a server, where a record in a data structure representing the prepaid card is updated to reflect its activation status. The activation process can be a security measure, as discussed above.

In 306, the point of sales terminal optionally processes a service charge. The system can collect a service charge for the feature of delayed payment on the prepaid card. This service charge can be processed at the time of sale of the prepaid card. For example, the service charge can be a fixed fee or a percentage of a prepaid card value.

Alternatively, the service charge can be processed at a later time, for example, when the delayed payment is processed.

Alternatively, a service charge is not charged.

In 308, the point of sales terminal can update the server. The point of sales terminal can transmit a message to the server over a network indicating the prepaid card has been sold. The server can then track which prepaid cards have been sold and are awaiting redemption, and which prepaid cards remain on store shelves awaiting sale.

In 310, the point of sales terminal provides the purchased prepaid card to the purchaser. The operator of the point of sales terminal can physically hand over the purchased prepaid card to the purchaser.

The point of sales terminal also receives a delayed payment from the purchaser. As discussed above, the delayed payment can be any form of payment that can be processed at a later time when the prepaid card is redeemed.

In 312, the point of sales terminal optionally provides a receipt to the purchaser. The receipt can include a prepaid card description, the prepaid card identifier, a purchase price, a description of the delayed payment process, redemption options, and an expiration date, if applicable. The receipt can also include a machine-readable code representing the prepaid card identifier, for use in checking a status of the prepaid card, discussed below.

In 314, the point of sales terminal exits the procedure.

In an alternative embodiment, the prepaid card is sold from an automated kiosk. In this example, the purchaser indicates a selection and quantity of the desired prepaid card, and the kiosk dispenses the prepaid card after a delayed payment has been received.

Figure 3B:
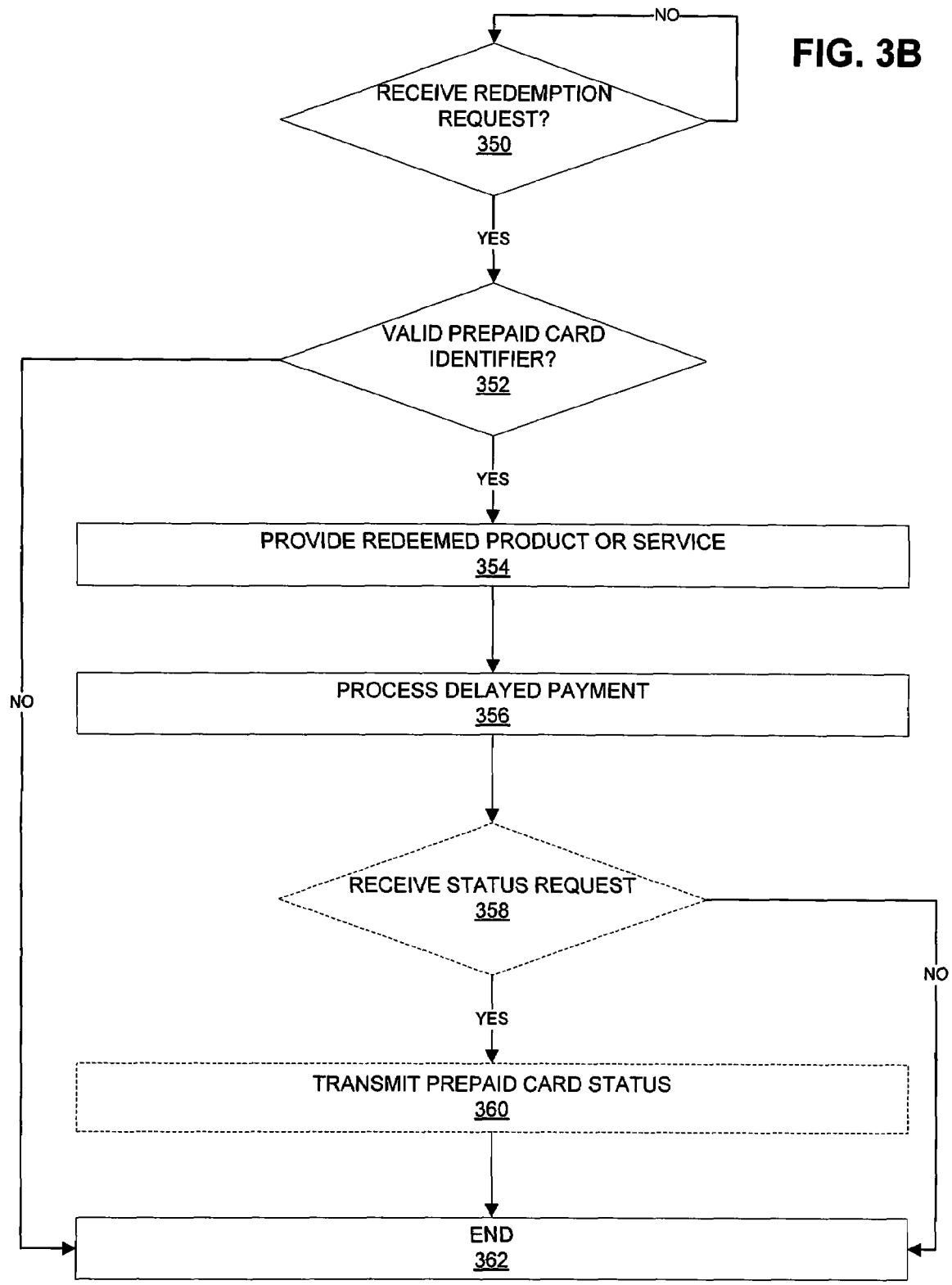
FIG. 3B illustrates a procedure for redeeming a delayed payment prepaid card.

FIG. 3B illustrates a procedure for redeeming a delayed payment prepaid card. A prepaid card is sold to a purchaser as illustrated in FIG. 3A. The prepaid card is redeemed by a recipient for a consideration at a user terminal in communication with a card server. For example, the recipient can be the same person as the purchaser, or a different person. The procedure can execute on the card server.

In 350, the card server determines whether a redemption request is received. For example, a recipient can access a user terminal that is configured to submit redemption requests to the card server. For example, a user terminal can be a computing accessible to the recipient, or a terminal at a physical redemption location.

If a redemption request is received, the card server proceeds to 352. If no redemption request is received, the card server waits for the redemption request at 350.

In 352, the card server determines whether the received prepaid card identifier is valid. The card server checks whether the received prepaid card identifier matches a set of valid prepaid card identifiers in memory. For example, prepaid card identifiers can be stored in a data structure as illustrated in FIGS. 4A and 4B. The card server can also check whether the prepaid card associated with the prepaid card identifier has been validly activated, has not expired, or otherwise ensure the prepaid card is valid.

If the prepaid card identifier is valid, the card server proceeds to 354. If the prepaid card identifier is not valid, the card server displays an error message and proceeds to 362, where the procedure exits.

In 354, the card server initiates a redemption procedure to provide the redeemed consideration to the recipient. For example, the card server can transmit an authorization to a redemption server that provides the consideration. If the prepaid card is redeemed for a physical good, the redemption server can initiate a fulfillment procedure to locate and ship an appropriate product to the recipient. If the physical good is to be redeemed at a physical redemption location, the redemption server authorizes the release of the physical good by the physical redemption location.

If the prepaid card is to be redeemed for a service, the redemption server transmits an authorization to a service provider to provide the service to the recipient. If the service is provided at a physical location, such as laundry service, the redemption server transmits an authorization to the service provider's location. If the service is provided online, the redemption server electronically transmits an authorization to an online service provider.

In 356, the card server processes a delayed payment for the prepaid card. The delayed payment is received previously when the prepaid card is purchased, discussed above. The card server processes the delayed payment, for example, by charging the associated credit card account the value of the prepaid card plus a service charge, if any. Alternative forms of delayed payments can also be processed.

It will be appreciated that the server can provide the redeemed consideration and process the delayed payment in any order, as long as they are executed substantially concurrently in time.

In 358, the card server optionally tests whether a status request is received. The card purchaser can submit a request to view a status and a prepaid card identifier. The prepaid card identifier identifies the prepaid card for which the status is requested.

The card purchaser can submit the request from a personal computer or an automated kiosk. For example, the status of a prepaid card can include whether it has been redeemed, whether the prepaid card has expired, or any other administrative information useful to the purchaser.

In one example, the receipt of prepaid card purchase includes the prepaid card identifier in a machine-readable format. The card purchaser simply scans the receipt at an automated kiosk to view the status of the prepaid card.

If a status request is received, the card server proceeds to 360. If no status request is received, the card server exits the procedure in 362.

In 360, the card server transmits a prepaid card status for display. Responsive to the status request received in 358, the card server retrieves the status of the prepaid card from memory. Prepaid card status can be stored in the data structure illustrated in FIGS. 4A and 4B.

The prepaid card status is then transmitted to the personal computer or kiosk used by the card purchaser to submit the status request.

In 362, the card server exits the procedure.

In one example, the user terminal is a computing device accessible to the recipient, and the redeemed product or service is delivered to the recipient. In another example, the user terminal is at a physical redemption center, where the recipient redeems the prepaid card. The user terminal can be any computing device from which the recipient redeems the prepaid card for the associated products or services.

FIG. 4A illustrates an example data structure for storing prepaid card information. Metadata associated with prepaid cards in a system as illustrated above can be stored in a data structure 400 on a storage medium accessible to a server. The data structure 400 includes a set of records 402, each record 402 representing a prepaid card and its associated data.

It will be appreciated that the data structure 400 can be stored in a variety of ways. For example, it can be stored as a tab delimited or comma delimited flat file, in a relational database, in a proprietary file format, or another storage method accessible to a server. Different storage formats will provide different advantages for different applications, as will be appreciated. The metadata data structure can be used for accounting, auditing, fraud-detection, tracking, or other purposes.

FIG. 4B illustrates an example data entry for storing prepaid card information. Each record 402 represent a prepaid card, as discussed above. Each record 402 can contain a variety of metadata, such as a prepaid card identifier 404 associated with the prepaid card. The prepaid card identifier 404 can be a unique alphanumeric sequence of characters and used to identify a prepaid card.

The record 402 can also include a description 406 that is a text description of the consideration associated with the prepaid card. This can be provided printed on a receipt after purchase of the prepaid card.

The record 402 can also include an activation field 408. As discussed above, a prepaid card can be activated at a point of sale when purchased by a user. Alternatively, other activation procedures can be used. For example, the activation process can be a security measure.

The record 402 can also include a date of sale 410. The date of sale 410 can store a date of sale of the prepaid card. For example, prepaid cards can have an expiry date calculated from the date of sale. If necessary, a sale time can also be stored if the time of sale during the day is important, for example, to track sales trends throughout the day.

The record 402 can also include a date of activation 412. The date of activation can record a date of activation of the prepaid card. For example, prepaid cards can have an expiration date calculated from the date of activation. Similar to the date of sale, a time of activation can also be stored.

The record 402 can also include a date of use 414. The date of use 414 can record one or more dates on which the prepaid card was used. For a one-use prepaid card, such as a one-use domain name registration prepaid card, there is only one date in date of use field 414. For multi-use prepaid cards, date of use field 414 will include a set of dates. Similar to the date of sale, a time of use can also be stored.

The record 402 can also include a remaining value 416. The remaining value 416 can record a remaining value left on the prepaid card. In one example, the prepaid card can be a one-use prepaid card, such as a one-use domain name registration prepaid card. In this example, the remaining value 416 decrements to zero after the first use.

In another example, the prepaid card can be a multi-use prepaid card. In this example, the remaining value 416 maintains a remaining value on the prepaid card.

It will be appreciated that any amount and type of metadata may be associated with each card for other purposes.

As discussed above, one example embodiment of the present invention can be a method for delayed payment of prepaid cards. The method comprises providing a prepaid card to a purchaser, the prepaid card associated with a face value. The method comprises, responsive to a redemption of the prepaid card, providing a consideration in accordance to the face value. The method comprises receiving a payment for the prepaid card after the consideration has been provided. The consideration is a product or a service. A received payment amount is a sum of the face value and a service charge. A service charge is received when the gift card is provided. Multiple prepaid cards are packaged together for sale and each prepaid card is given to a gift recipient as a gift. The method comprises, responsive to a purchaser request, displaying a status of the prepaid card. The provided consideration is less than the face value, and the payment is prorated to reflect the provided consideration.

Another example embodiment of the present invention can be a system for accepting delayed payment of prepaid cards. The system comprises a prepaid card, the prepaid card provided to a purchaser and associated with a face value. The system comprises a redemption server configured to, responsive to a redemption of the prepaid card, provide a consideration in accordance to the face value. The system comprises a card server configured to receive a payment for the prepaid card from the purchaser after the consideration has been provided. The consideration is a product or a service. A received payment amount is a sum of the face value and a service charge. A service charge is received when the gift card is provided. Multiple prepaid cards are packaged together for sale and each prepaid card is given to a gift recipient as a gift. The card server is further configured to, responsive to a purchaser request, displaying a status of the prepaid card. The provided consideration is less than the face value, and the payment is prorated to reflect the provided consideration.

Another example embodiment of the present invention can be a computer-readable medium including instructions adapted to execute a method for delayed payment of prepaid cards. The method comprises providing a prepaid card to a purchaser, the prepaid card associated with a face value. The method comprises, responsive to a redemption of the prepaid card, providing a consideration in accordance to the face value. The method comprises receiving a payment for the prepaid card after the consideration has been provided. The consideration is a product or a service. A received payment amount is a sum of the face value and a service charge. A service charge is received when the gift card is provided. Multiple prepaid cards are packaged together for sale and each prepaid card is given to a gift recipient as a gift. The method comprises, responsive to a purchaser request, displaying a status of the prepaid card. The provided consideration is less than the face value, and the payment is prorated to reflect the provided consideration.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method for delayed payment of prepaid cards, comprising:

responsive to receiving a service charge payment to purchase prepaid cards, providing the prepaid cards to a prepaid card purchaser;

receiving a delayed payment from the prepaid card purchaser activating the prepaid cards, wherein the delayed payment is not processed until one or more of the prepaid cards are redeemed;

responsive to a redemption of a prepaid card by a recipient, providing a product or a service associated with the prepaid card to the recipient; and processing the delayed payment by computer after the product or service has been provided.

2. The method of claim 1, wherein the prepaid cards are packaged together for sale and each prepaid card is given to its recipient as a gift.

3. The method of claim 2, further comprising:
responsive to a prepaid card purchaser request, displaying a status of a prepaid card.

4. The method of claim 1, wherein delayed payment is prorated to reflect the provided product or service.

5. A system for accepting delayed payment of prepaid cards, comprising:
a plurality of prepaid cards, the prepaid cards provided to a plurality of recipients, each prepaid card associated with a card value disclosed to its recipient;
a redemption server configured to, responsive to a redemption of a prepaid card by a recipient, provide a product or service associated with the prepaid card to the recipient; and
a card server configured to,
receive a service charge payment to purchase the prepaid cards,
receive a delayed payment from a prepaid card purchaser activating the prepaid cards, wherein the delayed payment is not processed until one or more of the prepaid cards are redeemed, and
process the delayed payment for the prepaid card after the product or service has been provided.

6. The system of claim 5, wherein the prepaid cards are packaged together for sale and each prepaid card is given to its recipient as a gift.

7. The system of claim 6, wherein the card server is further configured to, responsive to a prepaid card purchaser request, displaying a status of a prepaid card.

8. The system of claim 5, wherein the delayed payment is prorated to reflect the provided product or service.

9. A computer-readable medium including instructions adapted to execute a method for delayed payment of prepaid cards, the method comprising:
responsive to receiving a service charge payment to purchase prepaid cards, providing the prepaid cards to a prepaid card purchaser;
receiving a delayed payment from the prepaid card purchaser activating the prepaid cards, wherein the delayed payment is not processed until one or more of the prepaid cards are redeemed;
responsive to a redemption of a prepaid card by a recipient, providing a product or service associated with the prepaid card to the recipient; and
processing the delayed payment by processor after the product or service has been provided.

10. The computer-readable medium of claim 9, wherein the prepaid cards are packaged together for sale and each prepaid card is given to its recipient as a gift.

11. The computer-readable medium of claim 9, further comprising:
responsive to a prepaid card purchaser request, displaying a status of a prepaid card.

12. The method of claim 1, further comprising:
deactivating at least one prepaid card after expiration of an expiry date.

13. The method of claim 1, further comprising:
activating the prepaid cards by the prepaid card purchaser before providing the prepaid cards to the plurality of recipients.

14. The method of claim 1, wherein the delayed payment is held in escrow until processing.

15. The method of claim 2, wherein the packaged together prepaid cards are for complementary products or services.

16. The method of claim 1, wherein the prepaid cards are dispensed to the prepaid card purchaser from an automated kiosk.

17. A method for delayed payment of prepaid cards, comprising:
responsive to receiving a request to purchase a prepaid card and a service charge payment, providing the prepaid card to a prepaid card purchaser, wherein
the prepaid card is associated with a prepaid card identifier;
responsive to receiving an activation request, a delayed payment and the prepaid card identifier from the prepaid card purchaser over a network, activating the identified prepaid card for future redemption, wherein
the delayed payment is not processed until the prepaid card is redeemed, and
the prepaid card is associated with a prepaid card value corresponding to the delayed payment;
responsive to a redemption of the prepaid card by a recipient, providing a product or a service corresponding to the prepaid card value to the recipient;
processing the delayed payment by computer after the product or service has been provided.

\* \* \* \* \*